(12) United States Patent
Uchida

(10) Patent No.: US 9,023,268 B2
(45) Date of Patent: May 5, 2015

(54) IMPRINTING METHOD AND APPARATUS THEREFOR

(75) Inventor: Shinji Uchida, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 12/427,893

(22) Filed: Apr. 22, 2009

(65) Prior Publication Data

US 2009/0261504 A1     Oct. 22, 2009

(30) Foreign Application Priority Data

Apr. 22, 2008    (JP) .................... 2008-111763

(51) Int. Cl.
*B29C 59/02* (2006.01)
*G11B 5/855* (2006.01)

(52) U.S. Cl.
CPC ..................... *G11B 5/855* (2013.01)

(58) Field of Classification Search
USPC .................. 264/494, 446–447, 319, 132
See application file for complete search history.

(56) References Cited

U.S. PATENT DOCUMENTS

| | | | |
|---|---|---|---|
| 6,757,116 B1 * | 6/2004 | Curtiss et al. ............... 360/15 |
| 7,343,857 B2 | 3/2008 | Sakuarai et al. | |
| 2003/0069860 A1 | 4/2003 | Berndtsson et al. ........ 705/400 |
| 2003/0211410 A1 * | 11/2003 | Irie ............................ 430/22 |
| 2005/0116370 A1 * | 6/2005 | Ogino et al. ................ 264/40.1 |
| 2005/0284320 A1 * | 12/2005 | Sakuarai et al. ............ 101/368 |
| 2006/0115584 A1 | 6/2006 | Hattori et al. | |
| 2006/0286193 A1 | 12/2006 | Ando et al. | |
| 2007/0200276 A1 * | 8/2007 | Mackey et al. ............. 264/293 |

FOREIGN PATENT DOCUMENTS

| | | |
|---|---|---|
| JP | 2005-056535 A | 3/2005 |
| JP | 2005-108351 A | 4/2005 |
| JP | 2005-286222 A | 10/2005 |
| JP | 2006-326927 A | 12/2006 |

OTHER PUBLICATIONS

Guo, Nanoimprint Lithography: Methods and Material Requirements, Adv. Mater. 2007, 19, 495-513.*

* cited by examiner

*Primary Examiner* — Christina Johnson
*Assistant Examiner* — Xue Liu
(74) *Attorney, Agent, or Firm* — Rossi, Kimms & McDowell LLP

(57) ABSTRACT

An imprinting method includes the steps of setting a room-temperature imprint resist-coated substrate and a mold having a transfer surface having a pattern of projections and recesses therein in an assembling jig, pressing the patterned surface of the mold against the resist surface of the substrate, and releasing the mold from the substrate to separate the substrate, the mold and the assembling jig from one another. The steps are performed in plural independent units in each of which one step is executed, and the mold and the substrate are paired with each other by the assembling jig and conveyed between the units in a range of from the alignment step to the separation step. An imprinting apparatus includes an alignment unit which performs the alignment step, a press unit performing the press step, and a separation unit performing the separation step, wherein conveyance devices are provided to convey the mold and substrate between units.

3 Claims, 9 Drawing Sheets

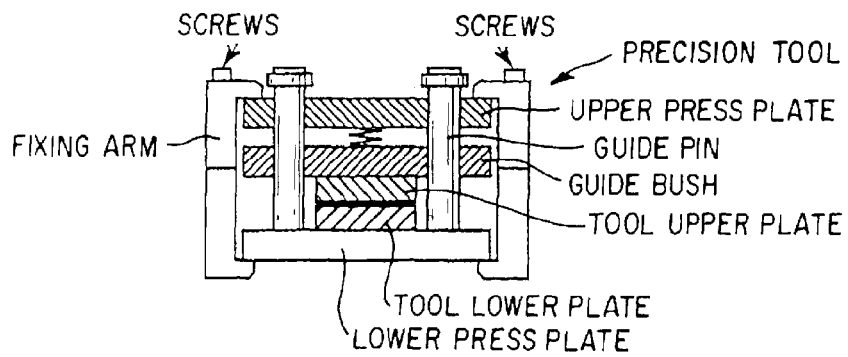
FIG. 10A
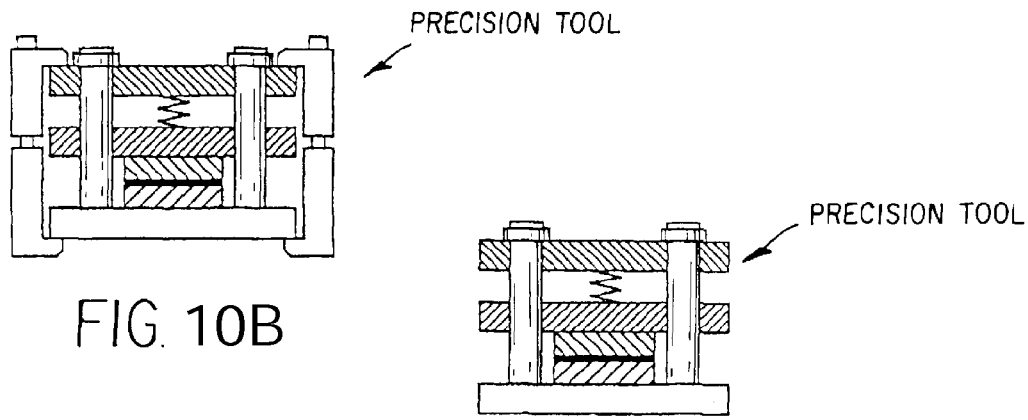
FIG. 10B
FIG. 10C
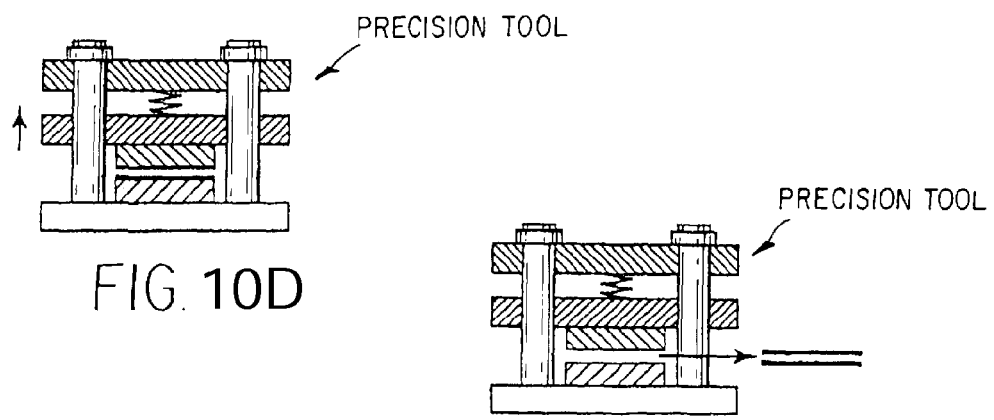
FIG. 10D
FIG. 10E

IMPRINTING METHOD AND APPARATUS THEREFOR

BACKGROUND

The present invention relates to an imprinting method and an apparatus therefor. Imprinting is a method in which a molding surface of a mold having very fine projections and recesses formed therein is pressed against a resin applied on a substrate to thereby transfer the shape of the molding surface to the resin.

In recent years, the capacities of hard disk drives have tended to increase and the recording densities of magnetic recording media have thus been increased. As track density increases in accordance with the increase in recording density, a leakage magnetic field is produced from a side surface of a head gap at the time of data writing. The leakage magnetic field causes production of noise to reduce S/N of a playback signal because unnecessary recording called 'side fringe' is performed on a region between adjacent tracks.

To avoid such a disadvantage, for example, a discrete track type magnetic recording medium having grooves provided between adjacent recording tracks has been proposed in JP-A-2005-56535. In the discrete track type magnetic recording medium, adjacent tracks are separated from each other so that the 'side fringe' problem can be avoided. On the other hand, a patterned medium has been proposed to form 1-bit dots on a disk for the purpose of improving recording density greater.

In either of the discrete track medium and the patterned medium, a minute pattern is formed on a disk. In most cases, the patterning is performed by an imprinting method. The imprinting method uses a mold having a minute pattern formed in a molding surface as a prototype mold for transferring the minute pattern to a surface of a substrate coated with a resin. Thermal imprinting using a thermoplastic resin and photo imprinting using a photo-setting resin are known as the imprinting method. Particularly, imprinting for forming a minute pattern with a nano-meter size is called nano-imprinting.

In the thermal imprinting, a resist pattern is generally formed by the following process. First, after a substrate is placed on a stage, a thermoplastic resin or a photo-setting resin is applied on a surface of the substrate. Then, the substrate and a mold having a molding pattern formed therein are heated to a temperature not lower than a glass transition temperature (Tg) and the mold is pressed against the resist-coated surface of the substrate by a predetermined load. In this condition, the substrate and the mold are held for a predetermined time so that the pattern of the mold is transferred to the resist of the substrate. Then, the mold and the substrate are cooled to a temperature lower than Tg of the resist and the mold is released from the substrate. The substrate having the thermoplastic or photo-setting resin onto which a convex shape corresponding to the concave shape formed in the molding surface of the mold has been transferred is taken out from the stage.

An example of an imprinting apparatus made from three units, that is, a substrate setting unit, a resin coating unit and a processing unit has been disclosed in JP-A-2006-326927. The processing unit performs alignment of a transfer body with a stamper, pressurization and release. In this example, a conveyance robot is disposed in the center while the three units are disposed on the circumference of a circle with the conveyance robot as the center of the circle.

Recently, there has been a method called room-temperature nano-imprinting using SOG (spin-on-glass) or the like (e.g. see JP-A-2005-108351). In this method, the mold is pressed before the resist is hardened by volatilization of a solvent at room temperature, and the mold is removed after the resist is hardened. In this manner, the pattern of the mold can be transferred to the resist. Accordingly, the heating-cooling process can be dispensed with, so that improvement in working efficiency can be attained.

In nano-imprinting commonly known at present, all nano-imprinting steps are performed in one place in one apparatus. The nano-imprinting steps are an alignment step for aligning a pattern of a mold with a predetermined position of a substrate, a heating step for heating the mold and the substrate, a press step for pressing the patterned surface of the mold against a surface of a resist applied on the substrate, a cooling step for cooling the mold and the substrate and a release step for releasing the mold from the substrate.

That is, because a mold provided as an expensive prototype mold produced by electron beam exposure has been heretofore used, it may be said that substrates are one by one subjected to the series of nano-imprinting steps using one mold.

A tact time of 300 or more sheets per hour is however required of either of the discrete track medium and the patterned medium. The required tact time cannot be achieved if all the series of nano-imprinting steps are performed in one apparatus.

The imprinting apparatus disclosed in JP-A-2006-326927 is an apparatus in which: a substrate is set by the substrate setting unit; the substrate is conveyed to the resin coating unit and coated with a photosensitive resin; the substrate is conveyed to the processing unit and subjected to alignment of a transfer body with a stamper, pressurization and release; and the processed substrate is conveyed to the substrate setting unit again and taken out. In the imprinting apparatus, while a substrate is present in any one of the units, any other substrate cannot be loaded because the units are disposed on the circumference of a circle with the conveyance robot as the center of the circle so that the conveyance robot conveys the substrate between the units. For this reason, the configuration of the imprinting apparatus disclosed in JP-A-2006-326927 is the same as in the case where all the series of nano-imprinting steps are performed in one apparatus.

In recent years, it has been possible to produce a large number of clone molds inexpensively from a very expensive prototype mold (e.g. see JP-A-2005-286222). The use of the large number of clone molds has permitted each step to be performed on an assembly line while the mold and the substrate are paired with each other.

In view of the above, it would be desirable to provide a method for performing nano-imprinting efficiently, and an apparatus therefor. The invention was developed in consideration of such circumstances.

SUMMARY OF THE INVENTION

The imprinting method according to the invention is a room-temperature imprinting method for forming a predetermined pattern in a resist surface of a substrate coated with an imprint resist at room temperature by using a mold having a pattern of projections and recesses formed in a transfer surface, including the steps of: setting the resist-coated substrate and the mold in an assembling jig so that the resist surface of the substrate and the patterned surface of the mold overlap each other (alignment step); pressing the patterned surface of the mold against the resist surface of the substrate (press step); and releasing the mold from the substrate to separate the substrate, the mold and the assembling jig from one another (separation step), wherein: the steps are performed in a plurality of independent units in each of which one step is executed; and conveyance steps for conveying the mold and the substrate paired with each other by the assembling jig between the units are provided between the units in a range of from the alignment step to the separation step.

Further, the imprinting apparatus according to the invention is as an apparatus for executing the imprinting method, including: an alignment unit which performs the alignment step for setting the resist-coated substrate and the mold in an assembling jig so that the resist surface of the substrate and the patterned surface of the mold overlap each other; a press unit which performs the press step for pressing the patterned surface of the mold against the resist surface of the substrate; and a separation unit which performs the separation step for releasing the mold from the substrate to separate the substrate, the mold and the assembling jig from one another, wherein: conveyance devices for conveying the mold and the substrate paired with each other by the assembling jig between the units are provided between the units.

According to the invention, a series of imprinting steps in production of discrete track media, patterned media, etc. are executed on an assembly line so that imprinting can be performed efficiently in a short tact time.

Other advantages, features, modifications and embodiments will become apparent to those skilled in the art from the following detailed description of the preferred embodiments of the invention.

BRIEF DESCRIPTION OF THE DRAWINGS

The invention will be described with reference to certain preferred embodiments thereof and the accompanying drawings, wherein:

FIGS. 10A to 10E are views showing a releasing procedure in a release unit; and

DETAILED DESCRIPTION OF THE PREFERRED EMBODIMENTS

An imprinting method according to the invention will be described first. In the imprinting method according to the invention, a mold having a formed of projections and recesses in a transfer surface and a substrate coated with a room-temperature imprint resist are used so that a predetermined pattern is formed in the resist surface of the substrate. The mold used herein is not an expensive prototype mold but one of a large number of clone molds copied from the prototype mold.

The imprinting method according to the invention includes the steps of: aligning a pattern of a mold with a predetermined position of a substrate (alignment step); pressing the patterned surface of the mold against a surface of a resist applied on the substrate (press step); and releasing the mold from the substrate to separate the substrate, the mold and the assembling jig from one another (separation step).

In the invention, a room-temperature imprint resist is used as the resist, so that a room-temperature imprinting method which performs pressing at room temperature is used. 'Room temperature' means a temperature in a range of 0° C. to 50° C., both inclusively. A sol-gel material is used as the room-temperature imprint resist. SOG (spin-on-glass) made of siloxane dissolved in a solvent is preferably used. Examples of siloxane used in SOG include silica glass, alkyl siloxane polymer, alkyl silsesquioxane polymer, silsesquioxane hydride polymer, and alkyl silsesquioxane hydride polymer. Examples of the solvent include alcohols such as methanol, ethanol, etc., ketones such as acetylacetone, etc., and esters such as lower alkyl ester, etc.

In the imprinting method, the steps are performed in a plurality of independent units in each of which one step is executed. Conveyance steps for conveying the mold and the substrate paired with each other by the assembling jig between the units are provided between the units in a range of from the alignment step to the separation step. When the number of the conveyance steps is two or more because the number of the units is three or more, the conveyance steps can be driven independently. Consequently, while the time required for processing in each unit is considered, the mold and the substrate can be conveyed to the next unit successively. Accordingly, imprinting can be performed on an assembly line, so that imprinting can be performed efficiently in a short tact time.

In the imprinting method according to the invention, it is preferable that the press step is performed under reduced pressure. The press step under reduced pressure can be achieved when a pressure reducing step is provided before the press step and an air opening step is provided after the press step. Atmospheric pressure at pressing is set at 10-5000 Pa, preferably at 100-1000 Pa. The pressure reduction permits the solvent to be volatilized to prevent void defects.

The imprinting apparatus according to the invention will be described below with reference to the drawings.

Figure 1:
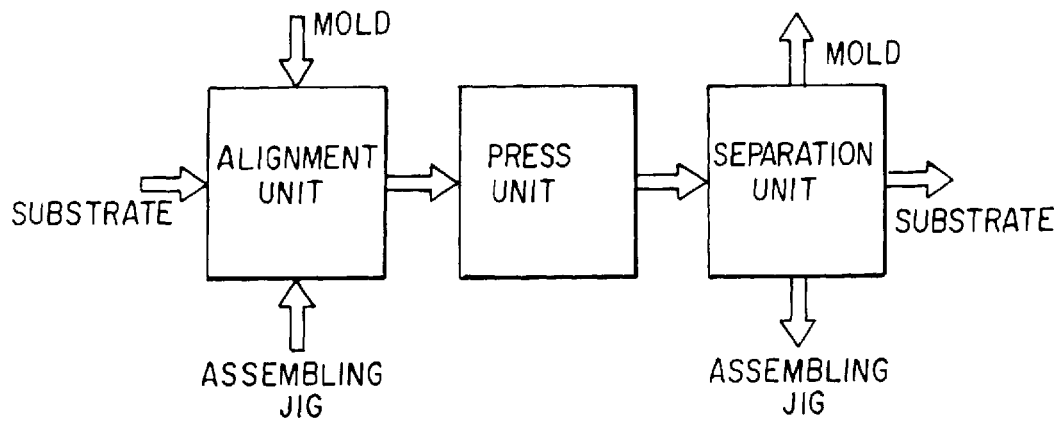
FIG. 1 is a view showing the configuration of an apparatus according to Embodiment 1 of the invention.

The configuration of each unit will be described first on the case where the apparatus according to the invention is configured as shown in FIG. 1 by way of example. FIG. 1 is a schematic view showing an example of configuration of the apparatus according to the invention. The apparatus configured as shown in FIG. 1 includes an alignment unit, a press unit, and a separation unit. The alignment unit is provided to perform an alignment step for setting a room-temperature imprint resist-coated substrate and a mold in an assembling jig so that the resist surface of the substrate and the patterned surface of the mold overlap each other. The press unit is provided to perform a press step for pressing the patterned surface of the mold against the resist surface of the substrate to form a predetermined patterned shape in the resist surface of the substrate. The separation unit is provided to perform a separation step for releasing the mold from the substrate to separate the substrate, the mold and the assembling jib from one another. Conveyance devices are provided between the alignment unit and the press unit, and between the press unit and the separation unit, respectively. The alignment unit is provided with a device for loading, into the alignment unit, the room-temperature imprint resist-coated substrate, the mold for forming a predetermined patterned shape in the resist surface of the substrate and the assembling jig for performing assembling so that the resist surface of the substrate and the patterned surface of the mold overlap each other. The separation unit is provided with a device for taking out the substrate having the patterned resist surface, the mold and the assembling jig from the separation unit individually.

Figure 6:
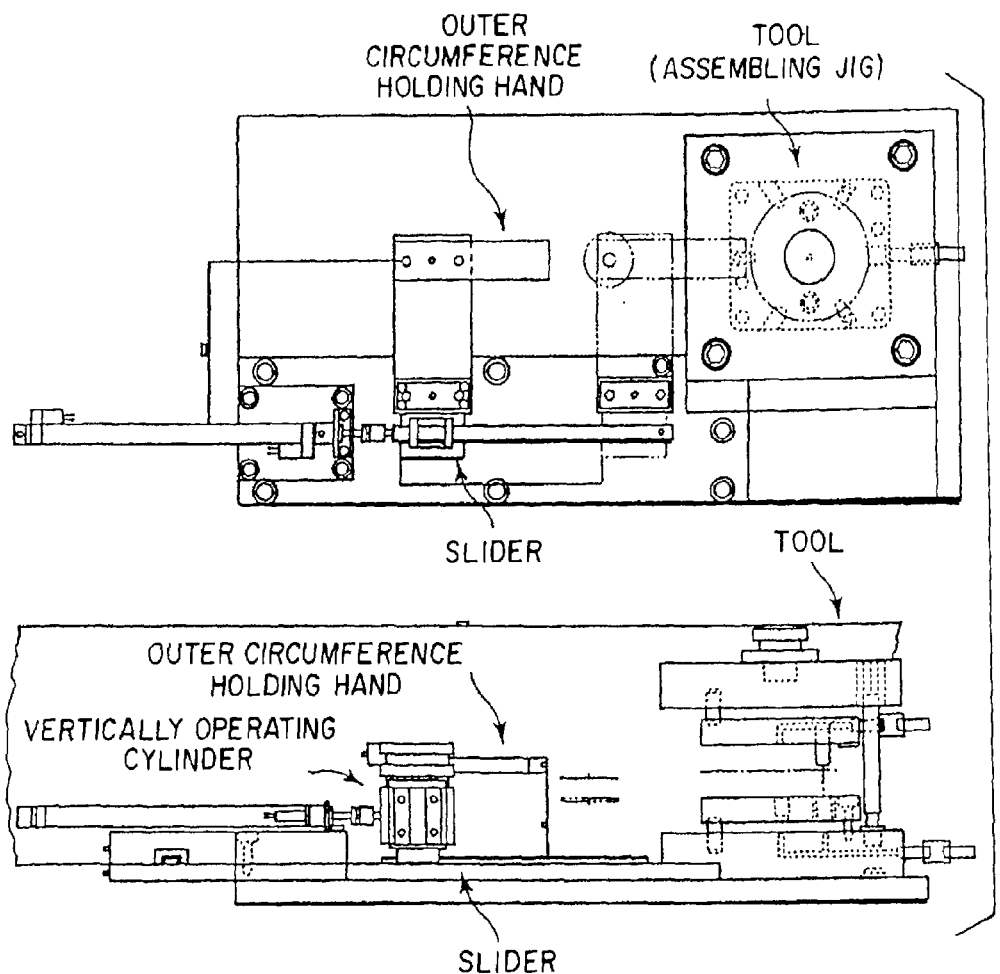
FIG. 6 is a view showing an example of an alignment unit.
Figure 7:
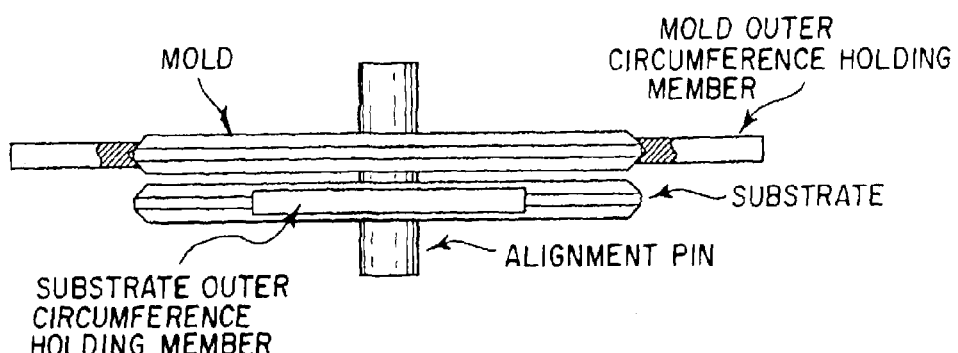
FIG. 7 is a view showing a state where the substrate and the mold are set on an alignment pin.

FIG. 6 shows an example of configuration of the alignment unit. The alignment unit has: an outer circumference holding hand for holding the substrate and the mold; an assembling jig provided with an alignment pin; a slider for sliding the substrate and the mold held by the outer circumference holding hand to a designated position in the assembling jig; a vertically operating cylinder for setting the substrate and the mold on the alignment pin; and a sensor for confirming that the substrate and the mold are set on the alignment pin. In the alignment unit, a substrate taken out from a cassette is moved to a designated position in a precision tool (assembling jig) by the outer circumference holding hand using the slider and the substrate is set on the alignment pin while the substrate is moved down by the vertically operating cylinder. Then, the hand is moved up and returned. Then, a mold is assembled from the opposite side in the same manner as described above. For example, a light-reflective sensor confirms whether the substrate and the mold are set on the alignment pin correctly as shown in FIG. 7.

Figure 8A:
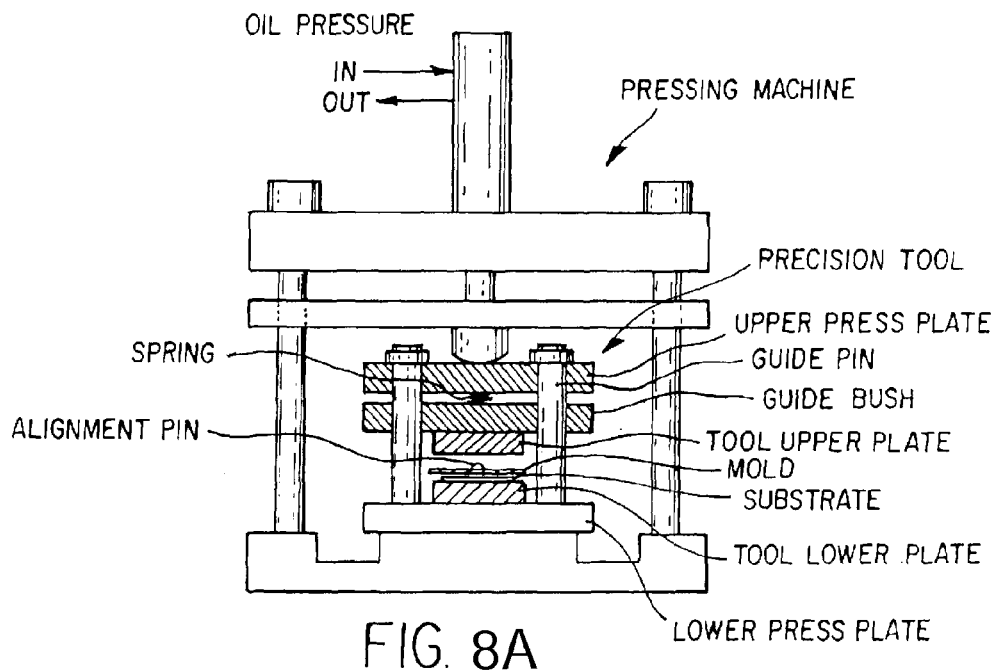
FIG. 8A is a side view showing a precision tool disposed in a pressing machine before pressing.
Figure 8B:
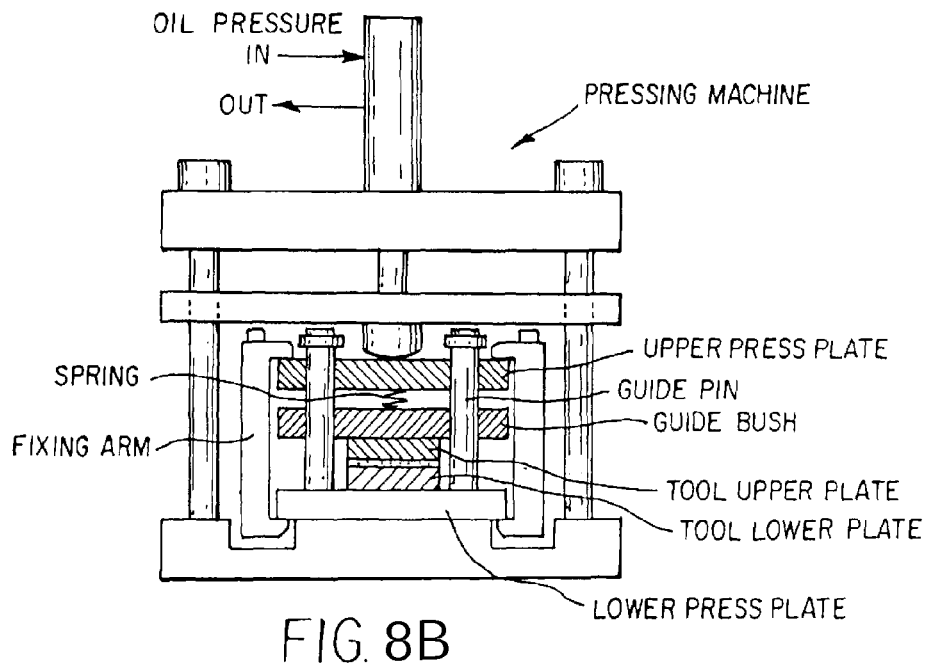
FIG. 8B is a side view showing the precision tool locked with fixing arms after pressing.
Figure 9:
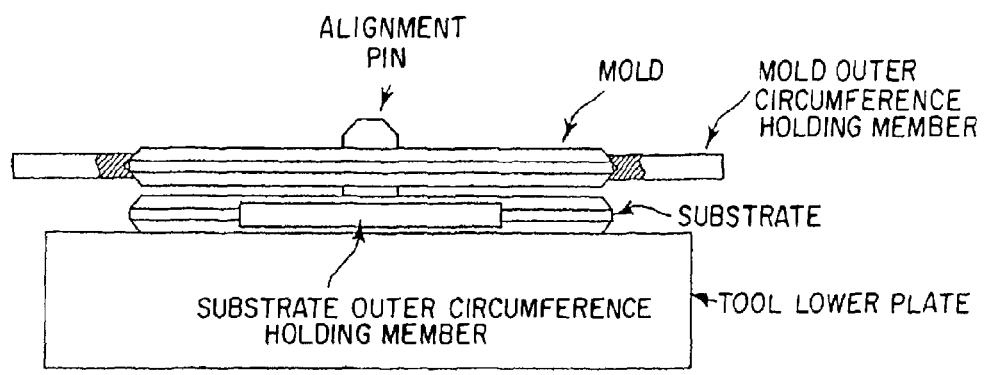
FIG. 9 is an enlarged side view of a portion where the substrate and the mold are incorporated in the precision tool.

As shown in FIGS. 8A and 8B, the press unit has a pressing machine, a precision tool (die set) set in the pressing machine, and fixing arms for locking the precision tool after pressing. Guide pins and guide bushes are incorporated in upper and lower press plates to prevent the precision tool from being pressed obliquely.

A spring is provided between the upper press plate and a guide bush board so as to be located in the central position (corresponding to the central holes of the substrate and the mold). As shown in FIG. 8A, the substrate-mold pair introduced into the press unit is mounted between tool lower and upper plates of the precision tool on the lower press plate while the substrate and mold outer circumference holding members remain in the substrate-mold pair. The pressing machine applies a pressure of about 0.1 to 10 MPa to the substrate-mold pair. As shown in FIG. 8B, in the state where the pressing machine applies the pressure to the substrate-mold pair, fixing arms are attached to the precision tool. After the fixing arms are screwed up so that the precision tool is locked with the fixing arms, the solvent is volatilized, a pattern is imprinted and the locked precision tool is conveyed to the separation unit. Because the guide pins and the guide bushes are incorporated in the upper and lower press plates of the precision tool, the pressure acts in a direction perpendicular to the patterned surface so that the minute pattern of the mold can be transferred to the resist accurately without destruction of the minute pattern.

Figure 11:
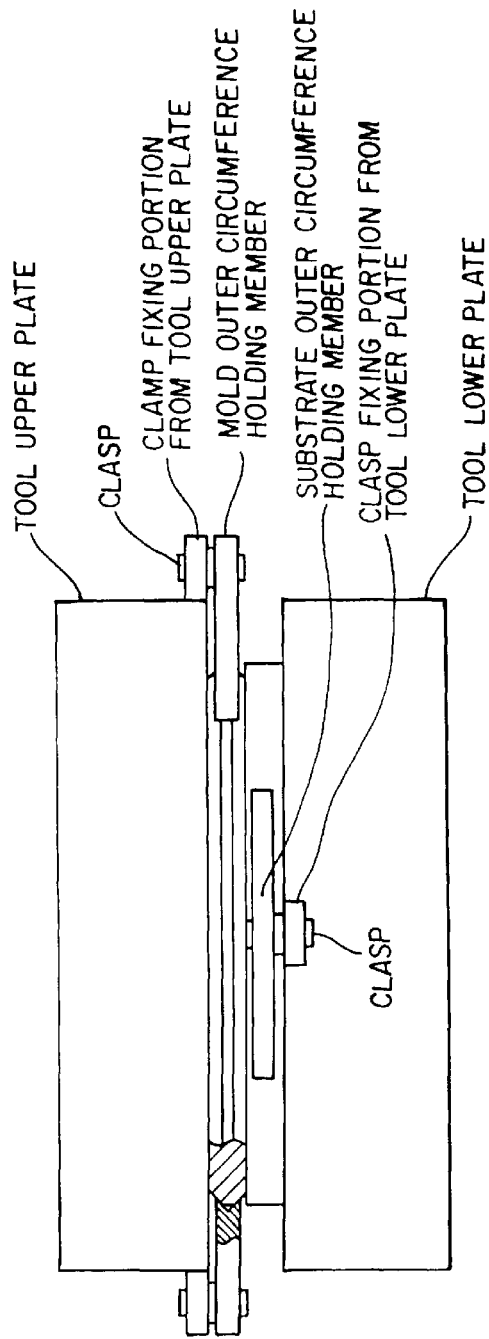
FIG. 11 is a view showing a state where mold and substrate outer circumference holding members are attached to tool upper and lower plates respectively.

FIGS. 10A to 10E show a separating procedure in the separation unit. In the separation unit, the fixing arms of the precision tool are screwed down as shown in FIG. 10A and removed as shown in FIG. 10B. Then, the mold outer circumference holding member is attached to the tool upper plate and the substrate outer circumference holding member is attached to the tool lower plate as shown in FIG. 10C. FIG. 11 shows this state. Then, the tool upper plate is lifted up as shown in FIG. 10D so that the mold and the substrate are separated from each other as shown in FIG. 10E. Because the upper surface of the tool upper plate is fixed to the lower surface of the guide bush board so that the guide bush board can move only vertically through the guide pins, the mold and the substrate are separated from each other in a direction perpendicular to the patterned surface. Then, the substrate and mold outer circumference holding members are removed from the precision tool and the substrate and the mold are removed from the outer circumference holding members respectively and taken out. The precision tool is conveyed to the press unit.

Various devices such as a belt conveyor and a car type conveyor can be used as the conveyance device. As is obvious from the above description, conveyance is performed in a state where the substrate-mold pair is fixed by the outer circumference holding members or by the precision tool.

Imprinting using this apparatus configuration is performed as follows. First, a resist-coated substrate, a mold and an assembling jig are loaded into the alignment unit. Then, the substrate and the mold are combined with the assembling jig and aligned with each other. Incidentally, when patterns are to be formed in opposite surfaces of the substrate, two molds may be assembled with the opposite (front and rear) surfaces of the substrate. Then, the assembling jig with which the substrate and the mold have been combined is conveyed to the press unit, so that the mold is pressed against the substrate under a predetermined pressure. Then, the assembling jig with which the substrate and the mold have been combined is conveyed to the separation unit, so that the mold is released from the substrate and removed from the assembling jig. Consequently, the substrate having the patterned resist, the mold and the assembling jig are taken out.

After the substrate and the mold combined with the assembling jig are conveyed from the alignment unit to the press unit, a next substrate, a next mold and a next assembling jig are loaded into the alignment unit at appropriate timing in consideration of the time required for processing in each unit. Then, as the substrate and the mold are moved to the next step, the next substrate and the next mold are conveyed to a free unit in the same manner as described above. Consequently, the mold and the substrate paired with each other are processed on an assembly line in accordance with each step.

Although a large-scale apparatus is required, a series of operations from loading into the alignment unit to unloading from the separation unit may be performed under a clean booth in a series of devices so that contamination with particles contained in the air can be avoided. In this case, pattern defects caused by the particles and destruction of a mold stamper caused by involution of the particles can be prevented.

Figure 2:
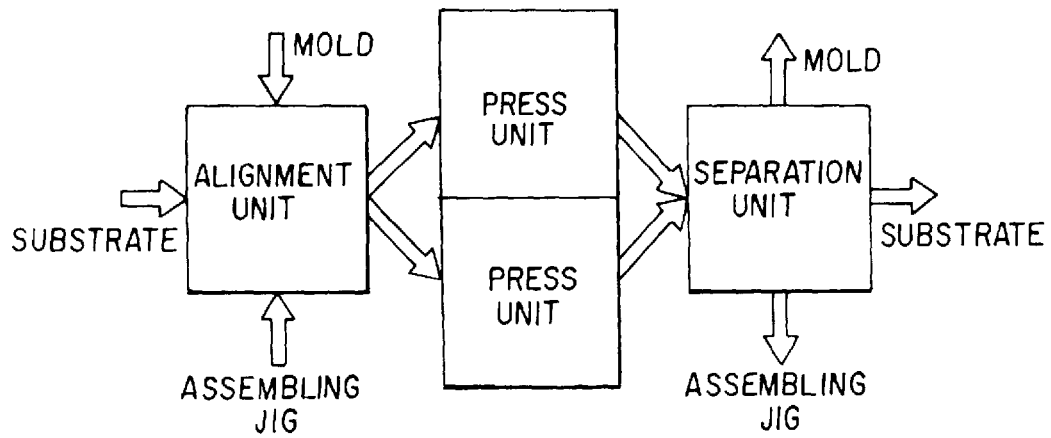
FIG. 2 is a view showing the configuration of an apparatus according to Embodiment 2 of the invention.

In the imprinting apparatus according to the invention, two or more units long in tact time may be provided in parallel with each other in accordance with the tact time of each unit. FIG. 2 shows an example of such configuration of the apparatus. That is, FIG. 2 shows an example of configuration of the apparatus in which two press units are arranged in parallel because the time required for the press step is about twice as long as the time required for the alignment step or the separation step. In this example, after alignment is completed, the mold and the substrate combined with the assembling jig are conveyed from the alignment unit to one of the two press units and subjected to pressing. On the other hand, a next mold-substrate pair are conveyed to the alignment unit and subjected to alignment in the alignment unit. Even if the alignment is completed, processing in the press unit cannot be completed because the tact time of the press unit is longer than that of the alignment unit. Therefore, after the alignment is completed, the mold-substrate pair combined with the assembling jig are conveyed to the other press unit and processed. Consequently, imprinting can be performed more efficiently without any bottleneck in the longest tact time of the press unit. The parallel arrangement type imprinting apparatus is not limited to the example shown in FIG. 2. For example, various combinations of units may be used in accordance with the time required for each step.

Figure 3:
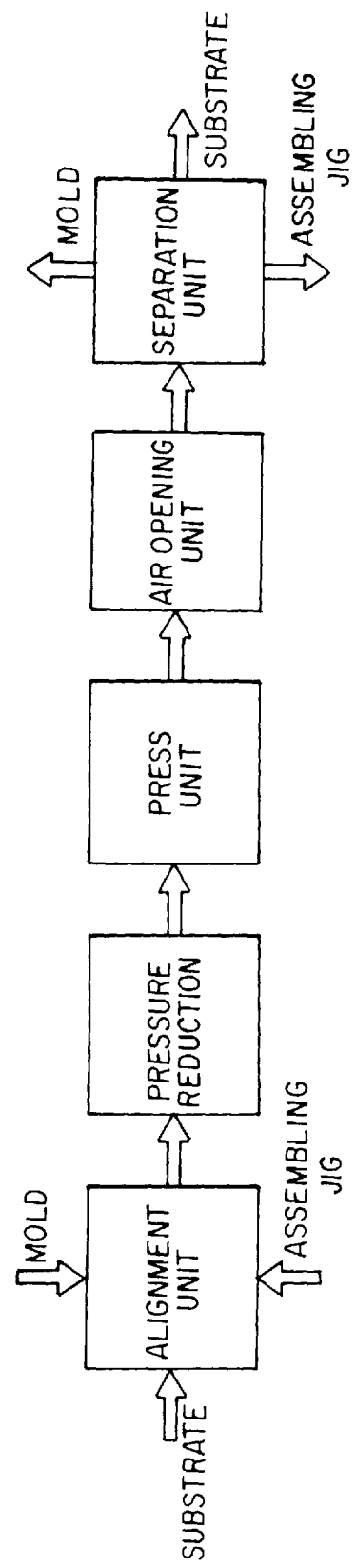
FIG. 3 is a view showing the configuration of an apparatus according to Embodiment 3 of the invention.

In the imprinting apparatus according to the invention, it is preferable that a pressure reducing unit is provided between the alignment unit and the press unit and an air opening unit is provided between the press unit and the separation unit as shown in FIG. 3.

Generally, when void defects occur in a transferred pattern shape, pressing under a vacuum is effective. Although the probability of occurrence of void defects varies according to the kind of the resist, the kind of the used solvent, the pressure at pressing, the shape of the pattern, etc., pressing at a vacuum generally permits reduction of defects caused by occurrence of voids.

The time of evacuation and air opening is however required for pressing at a vacuum. In such a case, the background-art apparatus was designed so that evacuation and air opening were performed in the press unit. Because a long time was required for evacuation and air opening, the background-art apparatus was unsuited to mass production. On the contrary, when the pressure reducing unit and the air opening unit are provided as shown in FIG. 3, products less in void defects can be obtained without spoiling in total tact time. The air opening unit may be dispensed with in accordance with the time required for air opening.

In the background-art method, the mold and the assembling jig were fixed into the nano-imprinting apparatus. For nano-imprinting, the resist-coated substrate was set on the fixed mold and fixed by the assembling jig. When the mold or the assembling jig was stained, it was necessary to remove the mold or the assembling jig from the nano-imprinting apparatus and clean the mold or the assembling jig. Because a long time was required for attaching the mold or the assembling jig to the nano-imprinting apparatus after the removal and cleaning, it was impossible to clean the mold or the assembling jig frequently. For this reason, the mold might be reused in a state where the resist was stuck to the mold or particles were involved in the mold, or the assembling jig might be reused in a state where the pin for aligning the inner diameter was worn out or worsened in terms of engagement.

To solve such a problem, the imprinting apparatus according to the invention may have a mold cleaning unit, a release agent processing unit, and a mold inspection unit. The mold cleaning unit is provided to perform a step for cleaning the mold separated from the substrate and the assembling jig by the separation unit. The release agent processing unit is provided to perform a release agent processing step for forming a release agent film on a surface of the mold cleaned by the mold cleaning unit. The mold inspection unit is provided to perform an inspection step for inspecting a state of the mold subjected to the release agent processing step in the release agent processing unit, determining whether the mold is to be reused or to be discarded, discarding the mold to be discarded and introducing a new mold in place of the discarded mold when the mold to be discarded occurs so that the mold to be reused or the new mold is loaded into the alignment unit through the conveyance device.

According to this apparatus, after the mold separated from the substrate and the assembling jig by the separation unit passes through the cleaning step, the release agent processing step and the inspection step, the mold to be reused is returned to the alignment step in which the mold is aligned with a substrate but the mold to be discarded as the result of the inspection is discarded and replaced by a new mold to be loaded into the alignment step in which the new mold is aligned with a substrate.

As a specific example, cleaning in the mold cleaning unit may be performed as follows. That is, three-stage cleaning may be used as mold cleaning. First, the opposite surfaces of the mold are air-blown by an air gun. Then, the mold is immersed in a volatile solvent such as isopropyl alcohol, ultrasonically cleaned with megasonic wave (1 MHz) and pulled up so as to be dried. Finally, the mold is dry-cleaned by a UV ozone cleaner.

In the release agent processing unit, the mold is dipped in a solution of a release agent (such as OPTOOL HD-2100 available from Daikin Industries, Ltd.) and pulled up. Then, for example, the mold is dried in a CR box at 24° C. 40% RH for 10 minutes and then left in a constant temperature and humidity condition of 60° C. 90% RH for 30 minutes. Finally, a rinsing operation can be used in such a manner that the mold is dipped in a rinsing solution such as a ZV solvent available from Daikin Industries, Ltd. and pulled up.

In the mold inspection unit, it is confirmed that there is neither residue of the resist nor particle. For example, inspection can be performed in such a manner that an image is taken by Micro-MAX VMX-3100-Model available from Vision Psytec Co., Ltd., a pattern of servo portions contained in the image is removed from the image by image processing and only defect portions of the residue of the resist and particles are displayed.

The imprinting apparatus according to the invention may have a jig cleaning unit, and a jig inspection unit. The jig cleaning unit is provided to perform a step for cleaning the assembling jig separated from the substrate and the mold by the separation unit. The jig inspection unit is provided to perform an inspection step for inspecting a state of the jig cleaned by the jig cleaning unit, determining whether the jig is to be reused or to be discarded, discarding the jig to be discarded and introducing a new jig in place of the discarded jig when the jig to be discarded occurs so that the jig to be reused or the new jig is loaded into the alignment unit through the conveyance device. According to this apparatus, after the jig separated from the substrate and the mold by the separation unit passes through the cleaning step, the release agent processing step and the inspection step, the jig to be reused is returned to the alignment step in which the mold and the substrate are combined with the jig, but the jig to be discarded as the result of the inspection is discarded and replaced by the new jig to be loaded into the alignment step in which the substrate and the mold are combined with the jig.

In the jig cleaning unit, for example, the assembling jig may be cleaned in such an air blowing manner that air is blown for 4 or 5 seconds in an air shower having left and right air nozzles.

In the jig inspection unit, for example, Micro-MAX VMX-3100-Model available from Vision Psytec Co., Ltd. is used to confirm that there is neither damage nor particle in surfaces of tool plates being in contact with the substrate and the mold.

Figure 4:
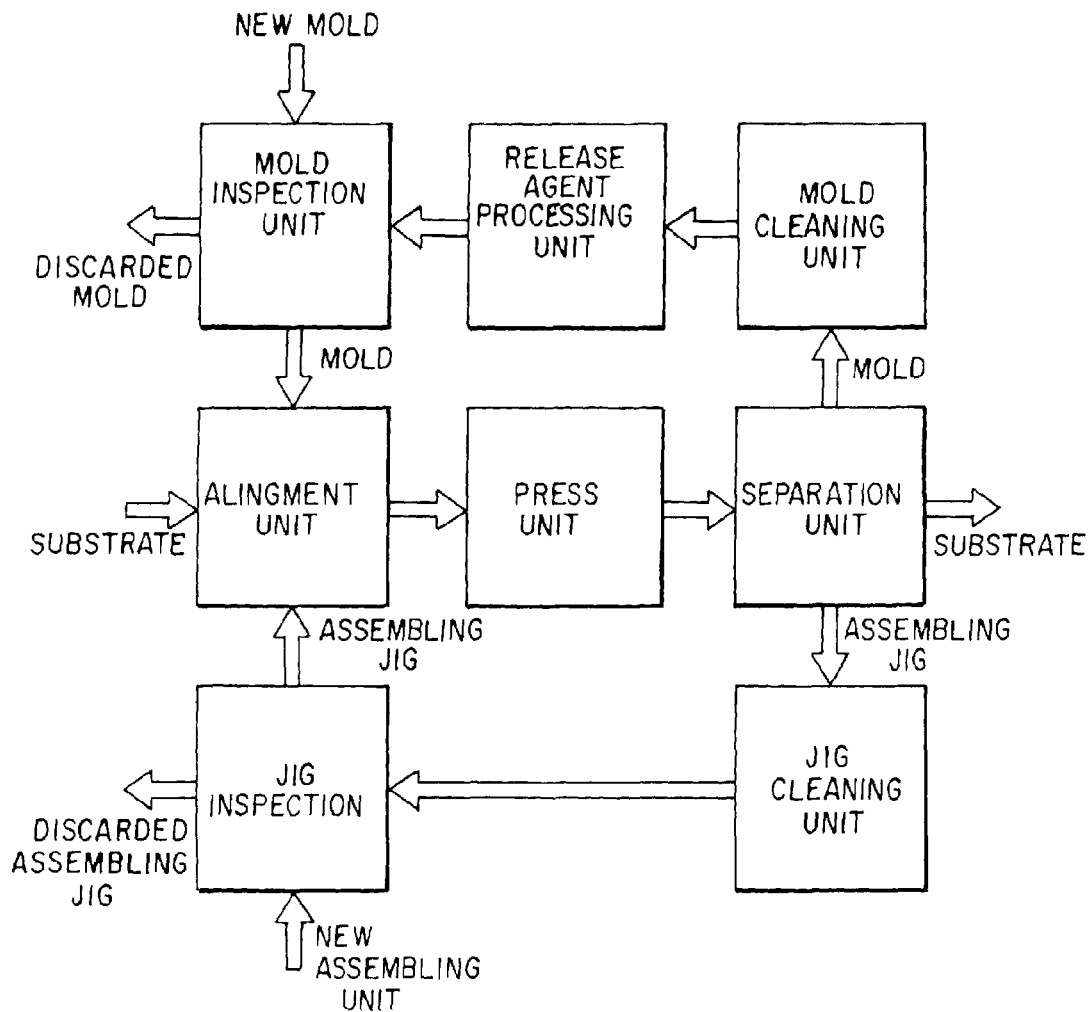
FIG. 4 is a view showing the configuration of an apparatus according to Embodiment 4 of the invention.
Figure 5:
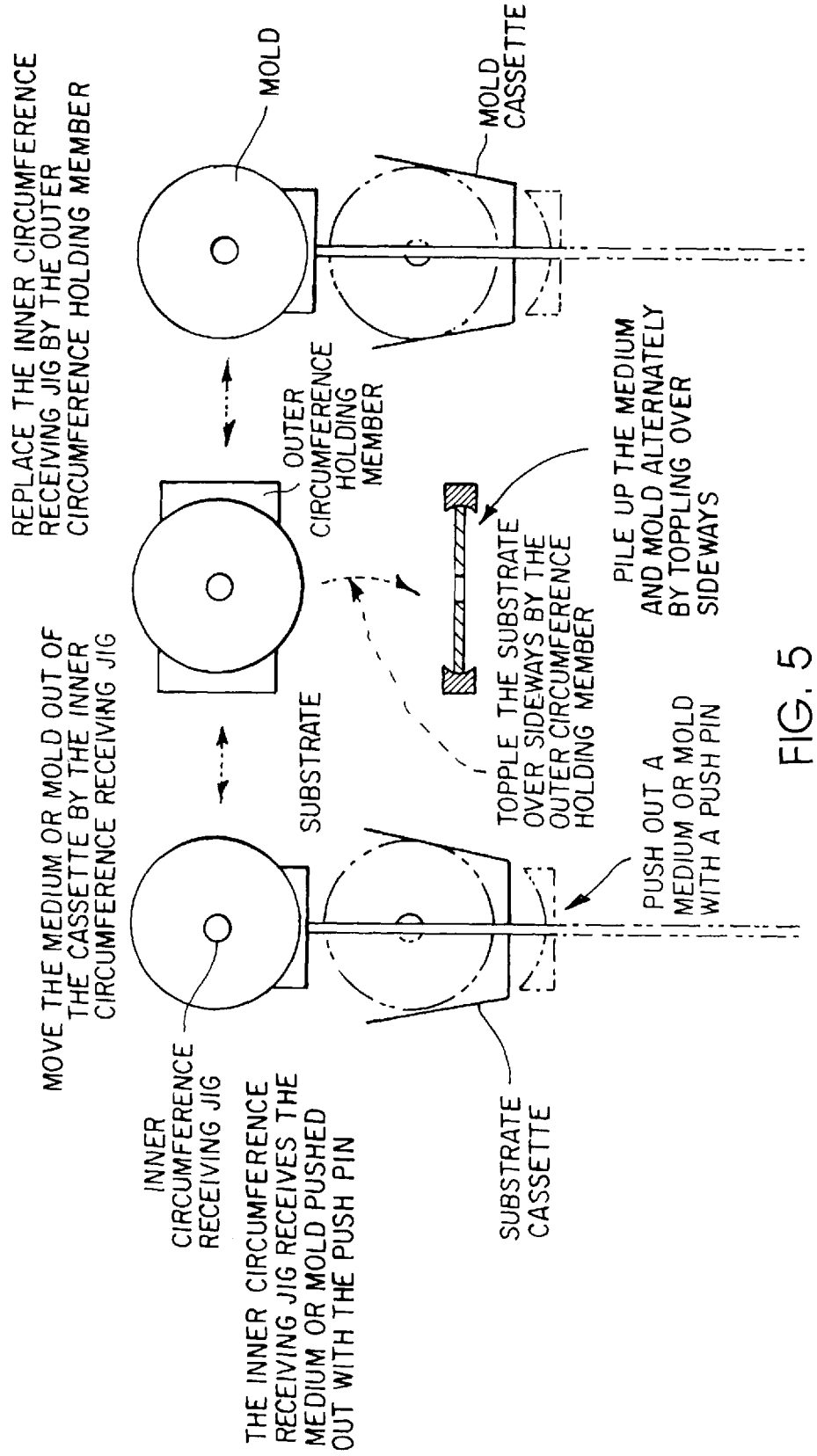
FIG. 5 is a view for explaining sandwich arrangement of a substrate and a mold in a loader unit.

FIG. 4 schematically shows the apparatus according to the invention.

When such steps are combined, the mold or the assembling jig can be recycled so that products can be produced more inexpensively while increase of wastes can be suppressed as sufficiently as possible.

Incidentally, the imprinting method and apparatus according to the invention can be applied to the case where resist patterns are formed in opposite surfaces of a substrate. That is, it is obvious that resist patterns can be formed in opposite surfaces of a substrate when the aforementioned steps are performed in the condition that the substrate having opposite resist-coated surfaces is used so that molds are set on the opposite surfaces of the substrate and combined with an assembling jig.

Although embodiments in which the imprinting apparatus according to the invention is applied to production of hard disks will be described in detail, the invention is not limited to these embodiments but can be applied to any other mode belonging to the spirit of the invention.

As shown in FIG. 1, the imprinting apparatus according to the first embodiment is separated into three zones, that is, an alignment unit, a press unit and a separation unit. A mold and a substrate paired with each other by an assembling jig are conveyed between the respective units to perform an imprinting process.

First, in the alignment unit, a substrate and a mold were taken out from cassettes respectively and mounted on a pin to thereby align the substrate with the mold.

That is, a cassette containing 25 molds each having a transfer surface in which a pattern of projection and recesses was formed and a cassette containing 25 substrates each having a surface coated with an SOG resist were loaded into the alignment unit.

In the alignment unit, a substrate and a mold were taken out from the cassettes respectively and holes provided in central portions of the substrate and the mold were fitted and set on a pin of an assembling jig so that the substrate and the mold were combined with the assembling jig while the centers of the inner diameters of the substrate and the mold were aligned with each other. In this embodiment, a Ni electroformed mold having a diameter of 75 mm and a thickness of 0.3 mm was used as the mold. A pattern of concentric circles with a pitch of 150 nm and a pattern depth of 50 nm was formed in a range between an outer diameter of 47 mm and an inner diameter of 17 mm in a surface of the mold. A magnetic recording medium having an outer diameter of 48 mm and a central hole with a diameter of 12 mm and coated with 100 nm-thick spin-on-glass (SOG) resist model number T-7 made by Tokyo Ohka Kogyo Co., Ltd. by a spin coater was used as the resist-coated substrate.

In this step, assembling jigs each of which was combined with a mold and a substrate paired with each other could be conveyed to the next press unit at intervals of 10 seconds.

Then, each assembling jig which was combined with the mold and the substrate paired with each other was conveyed from the alignment unit to the press unit.

Then, in the press unit, the patterned surface of the mold was pressed against the surface of the resist applied on the substrate under a pressing pressure of 20 MPa and this condition was kept for 5 seconds. Consequently, while the resist was fluidized to the pattern of the mold, undulation of the substrate surface was formed to imitate the undulation of the mold surface so that a resist pattern even in the substrate surface could be obtained. In the press unit, a series of steps for pressing the press plates, increasing the pressure to 100 MPa, keeping the pressed state and conveying the assembling jig to the next step could be performed in 10 seconds after the assembling jig was conveyed to the press unit.

Then, the mold and the substrate paired with each other, combined with the assembling jig and pressed against each other were conveyed to the separation unit.

In the separation unit, while the substrate and the mold were held in a direction perpendicular to the pattern-forming surfaces, the substrate and the mold were separated from the pin of the assembling jig to thereby release the mold from the substrate so that the assembling jig, the substrate and the mold were taken out from the separation unit individually.

When a series of processes were performed in this manner on an assembly line in the units allocated to the steps respectively, patterned substrates could be produced at throughput of 10 seconds per sheet.

Incidentally, in this embodiment, a series of operations from loading into the alignment unit to unloading from the separation unit were performed in a clean booth. Consequently, contamination with particles contained in the air could be suppressed.

In the first embodiment, a pattern of concentric circles with a pitch of 100 nm and a pattern depth of 50 nm formed in a range between an outer diameter of 47 mm and an inner diameter of 17 mm in a surface was used as the pattern of the mold. On the other hand, in the second embodiment, a mold with a pattern pitch of 100 nm and a pattern depth of 60 nm was used. The same substrate and the same resist as used in the first embodiment were used in the second embodiment.

When the apparatus configured as shown in FIG. 1 was used and imprinting was performed in the same manner as in Embodiment 1, the pattern height of the formed resist pattern was only 45 nm. When the press time was therefore changed to 12 seconds, the pattern height of the formed resist pattern became 60 nm. In this case, total throughput was however worsened because the time requires for the press unit was not shorter than 10 seconds.

Therefore, in this embodiment, the apparatus was configured so that two press units were provided in parallel as shown in FIG. 2. When sets of molds, substrates and assembling jigs taken out from the alignment unit were conveyed alternately to the two press units which were provided in parallel and pressed by the press units, imprinted products with a desired pattern height could be obtained without spoiling the total throughput.

In the first embodiment, a pattern of concentric circles with a pitch of 100 nm and a pattern depth of 50 nm formed in a range between an outer diameter of 47 mm and an inner diameter of 17 mm in a surface was used as the pattern of the mold. On the other hand, in the third embodiment, a mold with a pattern pitch of 60 nm and a pattern depth of 40 nm was used. The same substrate and the same resist as used in the first embodiment were used in the third embodiment.

When imprinting was performed in the same manner and the same conditions as in the first embodiment except the condition of the mold, void defects occurred in some places of the formed resist pattern.

To prevent the occurrence of void defects, an attempt was made to apply pressure reduction and air opening in the press unit to the apparatus configuration shown in FIG. 1. The total throughput was however worsened because a time of about 5 seconds was required for changing air pressure to a vacuum of 500 Pa so that the time required for the step in the press unit was not shorter than 10 seconds.

Therefore, in this embodiment, a pressure reducing unit was provided before the press unit and an air opening unit was provided after the press unit as shown in FIG. 3. Specifically, the assembling jig combined with the substrate and the mold was conveyed in the pressure reducing unit while the pressure in the pressure reducing unit was reduced from air pressure to 500 Pa in about 5 seconds by a vacuum pump. Then, the assembling jig combined with the substrate and the mold was conveyed to the press unit evacuated to a vacuum of 500 Pa in advance without air opening. Pressing was performed in this state, that is, under a vacuum of 500 Pa. Then, the assembling jig combined with the substrate and the mold was conveyed to the air opening unit without air opening. After the air opening unit was disconnected from the press unit, the pressure was returned to air pressure by the air opening unit.

When pressing was performed under a vacuum of 500 Pa in this manner, void defects could be prevented from occurring in the formed resist pattern.

When this apparatus configuration was used and a series of processes were performed on an assembly line by the units allocated to the steps respectively, patterned substrates could be produced at throughput of 10 seconds per sheet.

As an apparatus to solve the problem in the background-art imprinting apparatus in which the mold and the assembling jig were fixed, imprinting was performed in the same manner as in the first embodiment. In this embodiment, the apparatus was further configured as shown in FIG. 4. That is, the mold separated by the separation unit was conveyed into a mold cleaning unit. Opposite surfaces of the mold were air-blown by an air gun. Then, the mold was immersed in isopropyl alcohol, ultrasonically cleaned with megasonic wave (1 MHz), pulled up so as to be dried and finally dry-cleaned with a UV ozone cleaner. Then, mass-production NANOIM COATER NIM-0703 type SA available from Daikin Industries, Ltd. was used as a release agent processing unit. The mold cleaned by the mold cleaning unit was conveyed into the release agent processing unit. The mold was dipped in a solution of a release agent (OPTOOL HD-2100 available from Daikin Industries, Ltd.) and pulled up. Then, the mold was dried in a CR box at 24° C. 40% RH for 10 minutes and left in a constant temperature and humidity condition at 60° C. 90% RH for 30 minutes. Finally, the mold was dipped in a ZV solvent available from Daikin Industries, Ltd. and pulled up so as to be rinsed. Thus, a release agent film was formed on the mold surface.

After release agent processing in the release agent processing unit was completed, the mold was conveyed to a mold inspection unit. A state of the mold was inspected by Micro-MAX VMX-3100-Model available from Vision Psytec Co., Ltd. to determine whether the mold was to be reused or to be discarded. When the mold to be discarded occurred, the mold was discarded and a new mold was introduced in place of the discarded mold. The mold to be reused or the new mold was loaded to the alignment unit through the conveyance device. Further, the assembling jig separated by the separation unit was conveyed to a jig cleaning unit. The assembling jig was cleaned with air blown for 4 or 5 seconds in an air shower having left and right air nozzles. The jig cleaned by the jig cleaning unit was conveyed to a jig inspection unit. A state of the jig was inspected by the jig inspection unit to determine whether the jig was to be reused or to be discarded. When the jig to be discarded occurred, the jig was discarded and a new jig was introduced in place of the discarded jig. The jig to be reused or the new jig was loaded to the alignment unit through the conveyance device.

When the same mold, the same resist-coated substrate and the same assembling jig as used in Embodiment 1 were used in this embodiment and a series of processes as operations from the alignment unit to the separation unit were performed on an assembly line in the units allocated to the steps respectively in the same manner as in first embodiment, patterned substrates could be produced at throughput of 10 seconds per sheet. Because the mold could be recycled in total 1 hour from separation from the separation unit to loading into the alignment unit, three constant temperature and humidity tanks for processing ten cassettes each containing 25 molds were provided in parallel. In addition, because the assembling jig could be recycled in total 30 seconds from separation from the separation unit to loading into the alignment unit, three assembling jigs were provided in parallel. In this manner, each route could be performed on an assembly line after the passage of a predetermined time.

When the apparatus shown in FIG. 4 was used to perform imprinting and the mold and the assembling jig were cleaned and inspected in accordance with each imprinting cycle so as to be recycled, defects which occurred in the background art could be prevented.

The invention has been described with reference to certain preferred embodiments thereof. It will be understood, however, that modifications and variations are possible within the scope of the appended claims.

This application is based on, and claims priority to, Japanese Patent Application No: 2008-111763, filed on Apr. 22, 2008. The disclosure of the priority application, in its entirety, including the drawings, claims, and the specification thereof, is incorporated herein by reference.

What is claimed is:

1. An imprinting method provided as a room-temperature imprinting method for forming a predetermined pattern in a resist surface of a substrate coated with an imprint resist at room temperature by using a plurality of molds, each mold of the plurality of molds having a pattern of projections and recesses formed in a transfer surface, comprising the steps of:

setting, for each mold of the plurality of molds, the resist-coated substrate and the mold in an assembling jig so that the resist surface of the substrate and the patterned surface of the mold overlap each other, wherein the assembling jig maintains the substrate and the mold in overlapping alignment;

pressing, for each mold of the plurality of molds, the patterned surface of the mold against the resist surface of the substrate; and releasing, for each mold of the plurality of molds, the mold from the substrate to separate the substrate, the mold and the assembling jig from one another;

wherein the steps are performed in a plurality of independent units in each of which one step is executed;

wherein, for each mold of the plurality of molds, the mold and the substrate are paired with each other by the assembling jig and conveyed between the units from the setting to the releasing;

wherein the plurality of independent units can be selectively arranged such that only one or only two of the setting step, the pressing step and the releasing step can be performed on two units in parallel; and wherein at least one of the plurality of molds is disposed at each of the two units in parallel.

2. An imprinting method according to claim 1, wherein the pressing is performed under reduced pressure; and wherein the imprint resist is a spin-on-glass (SOG) material.

3. An imprinting method provided as a room-temperature imprinting method for forming a predetermined pattern in a resist surface of a substrate coated with an imprint resist at room temperature by using a plurality of molds, each mold of the plurality of molds having a pattern of projections and recesses formed in a transfer surface, comprising the steps of:

setting, for each mold of the plurality of molds, the resist-coated substrate and the mold in an assembling jig so that the resist surface of the substrate and the patterned surface of the mold overlap each other, wherein the assembling jig maintains the substrate and the mold in overlapping alignment;

pressing, for each mold of the plurality of molds, the patterned surface of the mold against the resist surface of the substrate; and releasing, for each mold of the plurality of molds, the mold from the substrate to separate the substrate, the mold and the assembling jig from one another;

wherein the steps are performed in a plurality of independent units in each of which one step is executed;

wherein, for each mold of the plurality of molds, the mold and the substrate are paired with each other by the assembling jig and conveyed between the units from the setting to the releasing;

wherein the plurality of independent units is arranged such that at least one of the setting step, the pressing step and the releasing step can be performed on two different substrates in parallel, with each of the different substrates being disposed at different independent units, and with each of the different substrates being associated with a different one of the plurality of molds.

* * * * *